(12) United States Patent
Johnson et al.

(10) Patent No.: US 10,793,772 B1
(45) Date of Patent: Oct. 6, 2020

(54) MONOLITHIC PHOSPHOR COMPOSITE FOR SENSING SYSTEMS

(71) Applicant: ACCELOVANT TECHNOLOGIES CORPORATION, Vancouver (CA)

(72) Inventors: Noah John Joe Johnson, Vancouver (CA); Ondrej Mecl, Vancouver (CA); Michael William Goldstein, Vancouver (CA)

(73) Assignee: ACCELOVANT TECHNOLOGIES CORPORATION, Vancouver, BC (CA)

( * ) Notice: Subject to any disclaimer, the term of this patent is extended or adjusted under 35 U.S.C. 154(b) by 0 days.

(21) Appl. No.: 16/844,880

(22) Filed: Apr. 9, 2020

Related U.S. Application Data

(63) Continuation of application No. 16/818,968, filed on Mar. 13, 2020, now abandoned.

(51) Int. Cl.
  *C09K 11/02* (2006.01)
  *G01D 5/353* (2006.01)
(52) U.S. Cl.
  CPC .......... *C09K 11/02* (2013.01); *G01D 5/35348* (2013.01)
(58) Field of Classification Search
  CPC .......................... C09K 11/02; G01D 5/35348
  (Continued)

(56) References Cited

U.S. PATENT DOCUMENTS

| | | |
|---|---|---|
| 4,075,493 A | 2/1978 | Wickersheim |
| 4,215,275 A | 7/1980 | Wickersheim |

(Continued)

FOREIGN PATENT DOCUMENTS

| | | |
|---|---|---|
| JP | S62118227 U | 7/1987 |
| JP | S634653 B2 | 1/1988 |

(Continued)

OTHER PUBLICATIONS

Stephen W. Allison et al., Phosphor Thermometry of Gas Turbine Surfaces, International Gas Turbine and Aeroengine Congress and Exposition, Houston, Texas, Jun. 5-8, 1995.

(Continued)

*Primary Examiner* — Seung C Sohn

(57) ABSTRACT

Examples of a monolithic phosphor composite for measuring a parameter of an object are disclosed. The composite comprises a thermographic phosphor and a metal oxide material that are dried and calcinated at high temperatures to form a ceramic metal oxide phosphor composite. The ceramic metal oxide phosphor composite is used in an optical device for measuring the parameter of the measuring object. The device comprises a fiber optic probe with a light guide, a light source operatively coupled to the fiber optic probe to provide excitation light into the light guide, a monolithic ceramic metal oxide phosphor composite functionally coupled to a tip of the fiber optic probe, a sensor operatively coupled to the fiber optic probe to detect the emitted light and a processing unit functionally coupled to the sensor to process the emitted light. When the monolithic ceramic metal oxide phosphor composite is illuminated with the excitation light it emits light in a wavelength different from the excitation light and a change in emission intensity at a single wavelength or the change in intensity ratio of two or more wavelengths, a shift in emission wavelength peak or a decay time of the phosphor luminescence is a function of the measuring parameter.

21 Claims, 3 Drawing Sheets

(58) Field of Classification Search
USPC .................................................. 250/214 R
See application file for complete search history.

(56) References Cited

U.S. PATENT DOCUMENTS

| | | | |
|---|---|---|---|
| 4,448,547 A | 5/1984 | Wickersheim | |
| 4,459,044 A | 7/1984 | Alves | |
| 4,652,143 A | 3/1987 | Wickersheim et al. | |
| 4,750,139 A | 6/1988 | Dils | |
| 4,859,079 A | 8/1989 | Wickersheim et al. | |
| 4,980,847 A | 12/1990 | Hirano | |
| 4,986,671 A | 1/1991 | Sun et al. | |
| 5,036,194 A | 7/1991 | Hazel | |
| 5,107,445 A | 4/1992 | Jensen et al. | |
| 5,183,338 A | 2/1993 | Wickersheim et al. | |
| 5,351,268 A | 9/1994 | Jensen et al. | |
| 5,364,186 A | 11/1994 | Wang et al. | |
| 5,414,266 A | 5/1995 | Sun | |
| 5,695,809 A | 12/1997 | Chadha et al. | |
| 5,775,808 A | 7/1998 | Pan | |
| 5,808,407 A | 9/1998 | Chung et al. | |
| 6,481,886 B1 | 11/2002 | Narendrnath et al. | |
| 6,667,527 B2 | 12/2003 | Lue et al. | |
| 7,326,365 B2 | 2/2008 | Bawendi et al. | |
| 7,377,689 B2 | 5/2008 | Balan | |
| 7,497,614 B2 | 3/2009 | Gaff et al. | |
| 7,578,616 B2 | 8/2009 | Gaff et al. | |
| 7,651,269 B2 | 1/2010 | Comendant | |
| 7,855,632 B1 | 12/2010 | Schuh et al. | |
| 8,226,769 B2 | 7/2012 | Matyushkin et al. | |
| 8,568,025 B2 | 10/2013 | Meilleur et al. | |
| 8,709,592 B2 | 4/2014 | Bird | |
| 8,995,798 B1 | 3/2015 | Paritsky et al. | |
| 9,599,518 B2* | 3/2017 | Djeu | G01K 11/20 |
| 9,625,923 B2 | 4/2017 | Bohlinger et al. | |
| 9,696,217 B2 | 7/2017 | Hockaday | |
| 10,444,083 B2 | 10/2019 | Nosrati | |
| 10,483,147 B2 | 11/2019 | Nosrati et al. | |
| 2004/0104336 A1 | 6/2004 | Melnyk et al. | |
| 2006/0215730 A1 | 9/2006 | Meilleur et al. | |
| 2007/0171958 A1 | 7/2007 | Hoang et al. | |
| 2008/0069180 A1 | 3/2008 | Djeu | |
| 2016/0011060 A1 | 1/2016 | Bergen et al. | |
| 2017/0096599 A1 | 4/2017 | Han et al. | |
| 2018/0080835 A1 | 3/2018 | Stapleton | |
| 2018/0274987 A1 | 9/2018 | Stapleton | |
| 2019/0204165 A1 | 7/2019 | Bergen et al. | |
| 2019/0314918 A1 | 10/2019 | Margavio et al. | |

FOREIGN PATENT DOCUMENTS

| | | | |
|---|---|---|---|
| JP | 2002071473 A | 3/2002 | |
| KR | 20020069934 A | 9/2002 | |
| KR | 100387659 B1 | 6/2003 | |
| KR | 20100000377 U | 1/2010 | |
| KR | 100965105 B1 | 6/2010 | |
| WO | 9859015 A1 | 12/1998 | |
| WO | 2005043099 A1 | 5/2005 | |
| WO | 2007028961 A2 | 3/2007 | |
| WO | 2016098586 A1 | 6/2016 | |

OTHER PUBLICATIONS

Zeljka Antic et al., Pulsed Laser Deposited Dysprosium-Doped Gadolinium-Vandate Thin Films for Noncontact, Self-Referencing Luminescence Thermometry, Advanced Materials 2016.

J Brubach et al., Characterization of Manganese-Activatd Magnesium Fluorogermanate With Regards to Thermographic Phosphor Thermometry, mEAS. sCl. tECHNOL. 19 (2008) 025602(11P).

* cited by examiner

US 10,793,772 B1

MONOLITHIC PHOSPHOR COMPOSITE FOR SENSING SYSTEMS

TECHNICAL FIELD

The present disclosure generally relates to a monolithic ceramic phosphor composite and more particular to a monolithic ceramic phosphor composite for measuring a parameter of an object being measured.

BACKGROUND

Unless otherwise indicated herein, the materials described in this section are not prior art to the claims in this application and are not admitted to be prior art by inclusion in this section.

Phosphors when excited with a light within a certain wavelength emit a light within a different wavelength. Certain characteristics of the emitted light change with temperature including brightness, color, and afterglow duration. The response of the emitted light to temperature is monitored by various methods, such as analyzing the change in emission intensity at a single wavelength or the change in intensity ratio of two or more wavelengths, lifetime decay, and shift in emission wavelength peak. Phosphor used for measuring the temperature of an object is either coated directly to the surface or placed within a probe and brought in contact with the surface, which is then illuminated with a light source and the temperature of the object is determined based on the response of the emitted light. Phosphors are commonly bound using a binder to achieve good thermal contact and uniform temperature response. Epoxy and polysiloxanes are commonly used as chemical binders, but this limits the usage of phosphors for high temperature sensing to few hundred degrees (200-400° C.) due to the limited thermal stability of the binders. Chemical binders for high temperature sensing can be thermally stable, and such chemical binders should not change the temperature response of the thermographic phosphor under high temperature thermal cycling and prolonged exposure.

SUMMARY

In one aspect, a monolithic ceramic metal oxide phosphor composite for measuring a parameter of an object is provided that comprises a thermographic phosphor and a metal oxide material. The thermographic phosphor is mixed with the metal oxide material to form a metal oxide phosphor composite material which is subsequently dried and calcined to form a ceramic metal oxide phosphor composite. The composite is used for measuring a parameter of an object being measured.

In another aspect, an optical device for measuring a parameter of an object is provided. The device comprises a fiber optic probe comprising a light guide, a light source operatively coupled to the light guide to provide an excitation light to a tip of the fiber optic probe, a monolithic ceramic metal oxide phosphor composite functionally coupled to the tip of the fiber optic probe, a sensor operatively coupled to the optical fiber to detect light emitted from the monolithic ceramic metal oxide phosphor composite and a processing unit functionally coupled to the sensor to process the light emitted by the monolithic ceramic metal oxide phosphor composite. When the monolithic ceramic metal oxide phosphor composite is illuminated with the excitation light it emits light in a wavelength different from the excitation light and a change in emission intensity at a single wavelength or the change in intensity ratio of two or more wavelengths, a lifetime decay or a shift in emission wavelength peak is a function of the measuring parameter.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

The present application discloses a monolithic ceramic metal oxide phosphor composite that is used for measuring a parameter of an object. The phosphor can be any thermographic phosphor. In one embodiment, the measuring parameter can be a temperature of the object. The monolithic ceramic metal oxide phosphor composite can perform repeatable and stable temperature sensing at temperatures higher than 250° C. without any thermal degradation. For example, it can be used for measuring temperatures above 400° C. without thermal degradation. Therefore, the monolithic ceramic metal oxide phosphor composite of the present invention is stable (does not thermally decompose below 1000° C.), while simultaneously maintaining the temperature sensing properties of the infused phosphor. In one implementation, the monolithic ceramic metal oxide phosphor composite can be used in any applications where high temperature sensing and durability is required.

Figure 1:
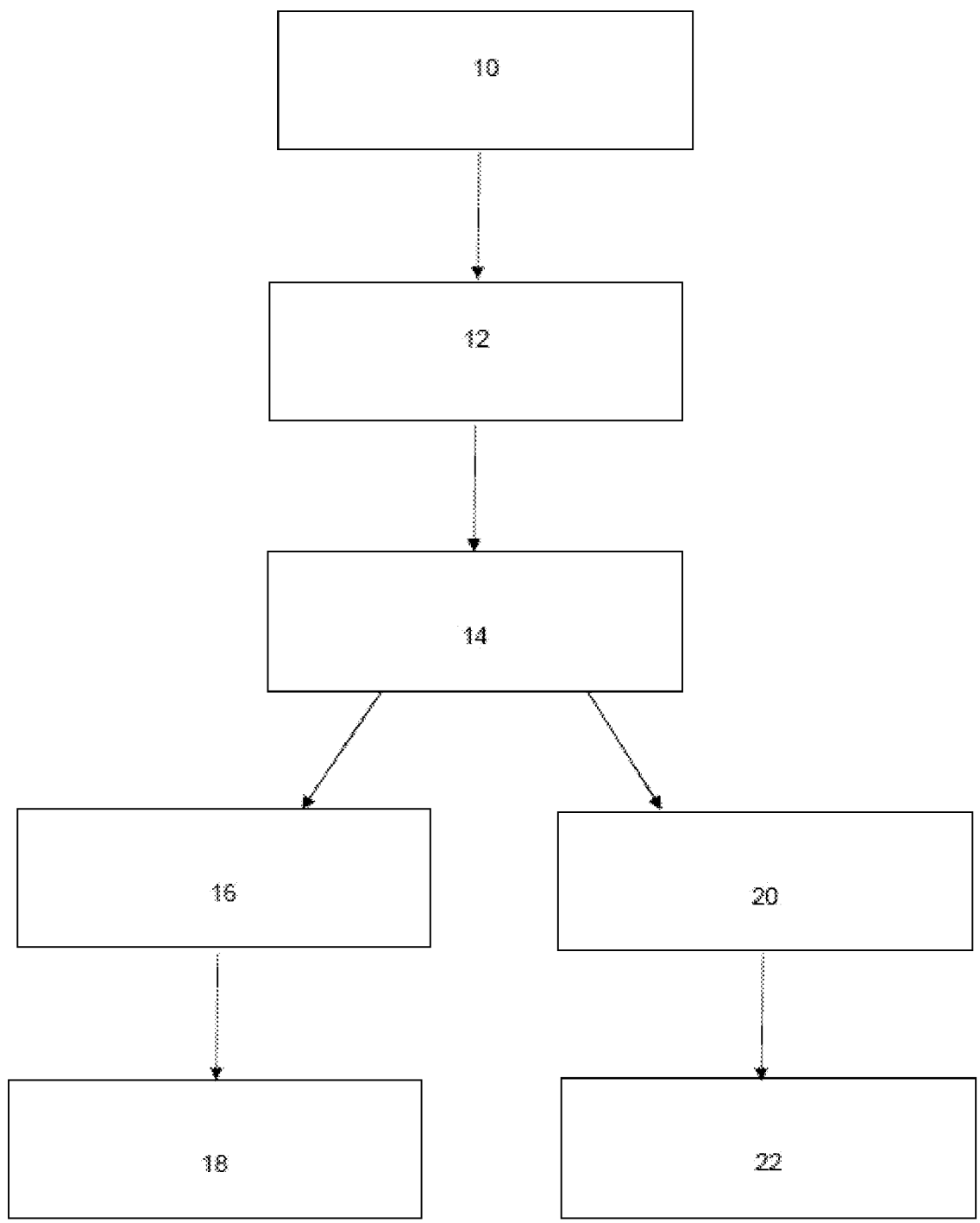
FIG. 1 is a flow chart of an example of a method for manufacturing a monolithic ceramic metal oxide phosphor composite.

FIG. 1 is a flow chart of an example of the method for manufacturing the monolithic ceramic metal oxide phosphor composite. The thermographic phosphor is a fine powder material that is dispersed in a solvent and metal organic precursor material (e.g. metal alkoxide) and mechanically mixed (step 10 in FIG. 1) to produce a mixed solution called mixed sol. Subsequently, a catalyst is added (step 12 in FIG. 1) to convert the mixed sol into a gel that is infused with the phosphor to form a metal oxide sol-gel phosphor composite material, as shown in step 14 of FIG. 1. For example, the catalyst can be any suitable acid or base that can form a gel-like diphasic system.

In one embodiment, the metal oxide sol-gel phosphor composite material is casted into a mold or die-casted to form a pre-determined shape and size (step 16 of FIG. 1) and then is dried and calcined at high temperatures of about 400-1500° C. (indicated at step 18 of FIG. 1) to form a monolithic ceramic metal oxide phosphor composite with pre-determined shape and size.

In another embodiment, the metal oxide sol-gel phosphor composite material obtained in step 14 can be pressed under high pressure to a predetermined shape and size (step 20 of FIG. 1). For example, a hot or cold pressing can be used to form the pressed metal oxide phosphor composite material. In one implementation, the material from step 14 of FIG. 1 can be dried and powdered, and the powder can be pressed into a predetermined shaped and sized (as per step 20 of FIG. 1). Then the pressed metal oxide sol-gel phosphor composite material is dried and calcined at high temperatures of about 400-1500° C. (step 22 of FIG. 1) to form the monolithic ceramic metal oxide phosphor composite. The drying and calcination step 22 of FIG. 1 can be done in atmospheric air and pressure or under specific gas atmosphere (e.g., nitrogen, oxygen, or argon) at ambient pressure or under reduced pressure conditions.

The ratio of the phosphor and metal oxide material is tuned by adjusting the amount of metal organic precursor material and phosphor during step 10 (FIG. 1) so that a content of the phosphor in the sol-gel composite is uniformed. The weight ration of the phosphor in said composite varies from 2 wt % to 90 wt % relative to the weight of the metal oxide material.

In some implementations, a solvent and a metal organic precursor material (e.g. metal alkoxide) are mechanically mixed (similar to step 10 in FIG. 1) without addition of a phosphor powder, which is then converted into a metal oxide sol-gel by adding a catalyst. The obtained metal oxide sol-gel is then mechanically blended with the phosphor powder using a mortar and pestle or a ball mill to get a uniform metal oxide sol-gel and phosphor powder. The mixed metal oxide sol-gel phosphor composite is then pressed under high pressure to a predetermined shape and size (step 20 of FIG. 1) and dried and calcinated, as per step 22 of FIG. 1, forming a monolithic ceramic metal oxide phosphor composite with pre-determined shape and size. In one embodiment, mixed metal oxide sol-gel phosphor composite is first casted into a mold or die-casted to form a pre-determined shape and size (similar to step 16 of FIG. 1) and then is dried and calcined at high temperatures (as per step 18 of FIG. 1) to form a monolithic ceramic metal oxide phosphor composite with pre-determined shape and size.

In one implementation, steps 10 to 14 are omitted and metal oxide phosphor composite can be prepared by mixing phosphor and a metal oxide powder mechanically to get a uniform metal oxide and phosphor powder which is then processed according to steps 20 and 22 of FIG. 1.

The thermographic phosphor can be selected from a group of Manganese doped $Mg_4FGeO_6$:Mn and all possible stoichiometry within this class, Europium doped $La_2O_2S$:Eu, Europium doped $Y_2O_3$:Eu, Europium doped $LuPO_4$:Eu, Dysprosium doped $YVO_4$:Dy, Dysprosium doped $Y_2O_3$:Dy, Dysprosium doped $LuPO_4$:Dy, Dysprosium doped Yttrium aluminium garnet YAG:Dy and any combination thereof.

The metal oxide is selected from a group of Silica ($SiO_2$), Zirconia ($ZrO_2$), Alumina ($Al_2O_3$), Titania ($TiO_2$) and combination thereof.

The obtained ceramic metal oxide phosphor composite is a mechanically hard material that can be embedded into the measuring object without any additional adhesive or binder. Then an optical measuring device can be used to illuminate the ceramic metal oxide phosphor composite material and detect the measuring parameter based on a decay time of the phosphor luminescence or by determining a change in emission intensity at a single wavelength or the change in intensity ratio of two or more wavelengths, or a shift in emission wavelength peak. In one embodiment the ceramic metal oxide phosphor composite material can be incorporated into the optical measuring device.

Figure 2:
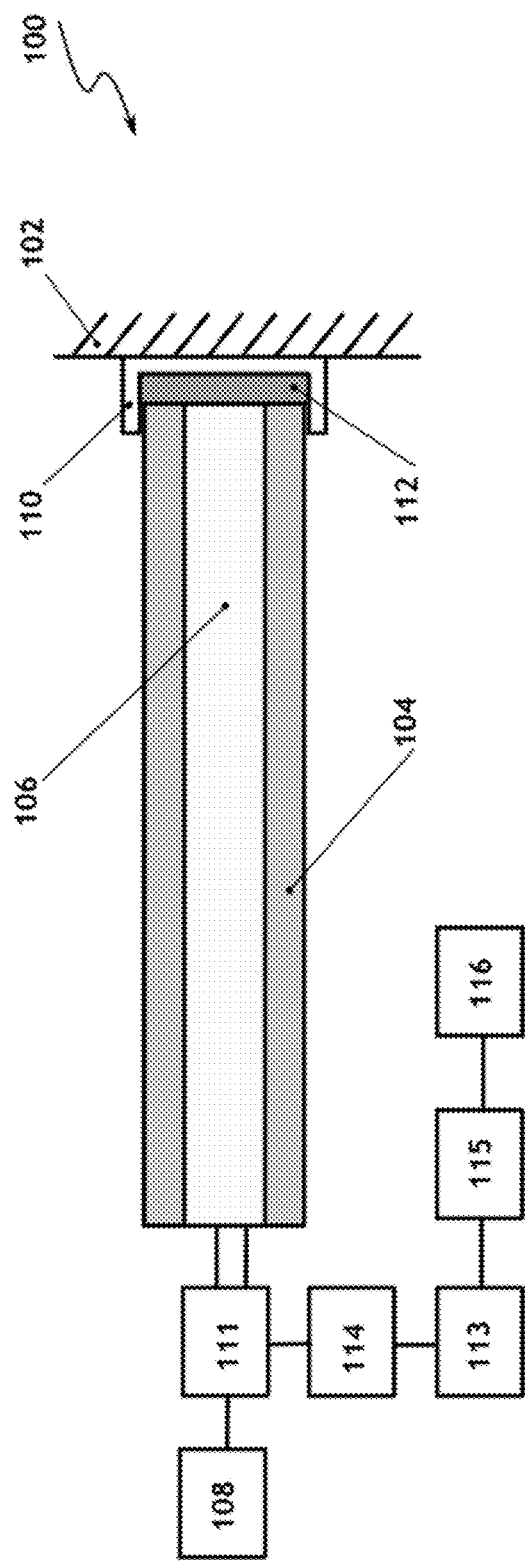
FIG. 2 is a schematic view of an example of an optical device for measuring a parameter of an object with a monolithic ceramic metal oxide phosphor composite mounted at a tip of the optical device.

FIG. 2 illustrates an example an optical measuring device 100 for measuring a parameter of an object 102. The device 100 comprises a fiber optic probe 104 that has a light guide 106 for transmitting an excitation light to a monolithic ceramic metal oxide phosphor composite 112 as well as a light emitted from the monolithic ceramic metal oxide phosphor composite 112 to a sensor 114. In the illustrated example, the monolithic ceramic metal oxide phosphor composite 112 is positioned in a notch formed on an inner surface of a tip 110 of the probe 104. A light source 108 is operatively coupled to the light guide 106 to provide the excitation light to the monolithic ceramic metal oxide phosphor composite 112. The light source 108 can provide excitation light in the UV waveband. For example, the light source 108 can provide an excitation light with a wavelength between 200-400 nm. In one embodiment, the light source 108 can provide an excitation light in the blue to green wavelength range (e.g. 400-600 nm). The light source can be a laser or a LED. The light emitted from the monolithic ceramic metal oxide phosphor composite 112 is detected by the sensor 114 that is operatively coupled to the light guide 106. The sensor can be for example a photodiode. The light emitted from the monolithic ceramic metal oxide phosphor composite 112 is in a wavelength different from the excitation light. For example, the emitted light can be in the red wavelength range, such as for example, 600-800 nm. Since the light guide 106 transmits both the excitation light and the emitted light, an optical splitter 111 can be provided to separate the excitation light from the emitted light. For example, the optical splitter 111 can be a mirror that is operatively coupled with the light guide 106, so that it can separate the UV/blue/green wavelength of the excitation light from the emitted light.

The sensor 114 converts the emitted light into an analog electrical signal. The photons absorbed by the photodetector (e.g. photodiode) generate an electrical current. The electrical signal can be intensified using an amplifier 113 that is functionally coupled to the sensor 114. The analog electrical signal can be then digitized using an A/D converter 115. A processing unit 116 then processes the digital signal obtained from the A/D converter in order to determine a change in an emission intensity at a single wavelength or the change in intensity ratio of two or more wavelengths, a lifetime decay, or a shift in emission wavelength peak each of which is a function of the measuring parameter. The sensor 114 can have multiple sensitive regions tuned for sensitivity of different wavelengths that allow measurement of emission intensity at different wavelengths. A predetermined lookup table with the emission intensity at a single wavelength or the change in intensity ratio of two or more wavelengths, a lifetime decay, or a shift in emission wavelength peak and measured parameter values is pre-programmed into the processing unit 116. Therefore, the processing unit 116 processes the digital signal and calculates a change in an emission intensity at a single wavelength or the change in intensity ratio of two or more wavelengths, a lifetime decay, or a shift in emission wavelength peak of the light emitted from the monolithic ceramic metal oxide phosphor composite 112, and using the lookup table, the processing unit 116 determines the measured parameter based on such calculated value. In one implementation, the optical splitter 111, the sensor 114, the amplifier 113, the A/D converter 115 and the processing unit 116 can be positioned in a same component, however persons skilled in the art would understand that each or some of those devices can be positioned separately one from the other without departing from the scope of the invention.

In one mode of operation, the tip 110 of the fiber optic probe 104 is brought into contact with the object 102. So, the device 100 is a contact probe that can measure the parameter of the object 102 at a single point. In one embodiment, the measuring parameter can be a temperature of the object 102. The tip 110 of the probe 104 can be made of gold or can be gold plated, so that it can increase the thermal conductivity of the device 100. When the light source 108 is turned on, it excites the monolithic ceramic metal oxide phosphor composite 112 positioned at the tip 110 of the probe 104. The monolithic ceramic metal oxide phosphor composite 112 can emit light in a wavelength different from the excitation light (e.g., it can emit light in the red wavelength range, such as for example, 600-800 nm). The emitted light through the light guide 106 passes through the mirror 111 before it is detected by the sensor 114. The detected signal amplified by the amplifier 113 and converted into digital signal is process by the processing unit 116. For example, the processing unit is pre-programmed to determine the change in the lifetime decay of the emitted light and based on the predetermined lookup table, it provides a value for the temperature of the object. The processing unit 116 can also control the operation of the device 100, such as the triggering time of the light source 108, for example.

Figure 3:
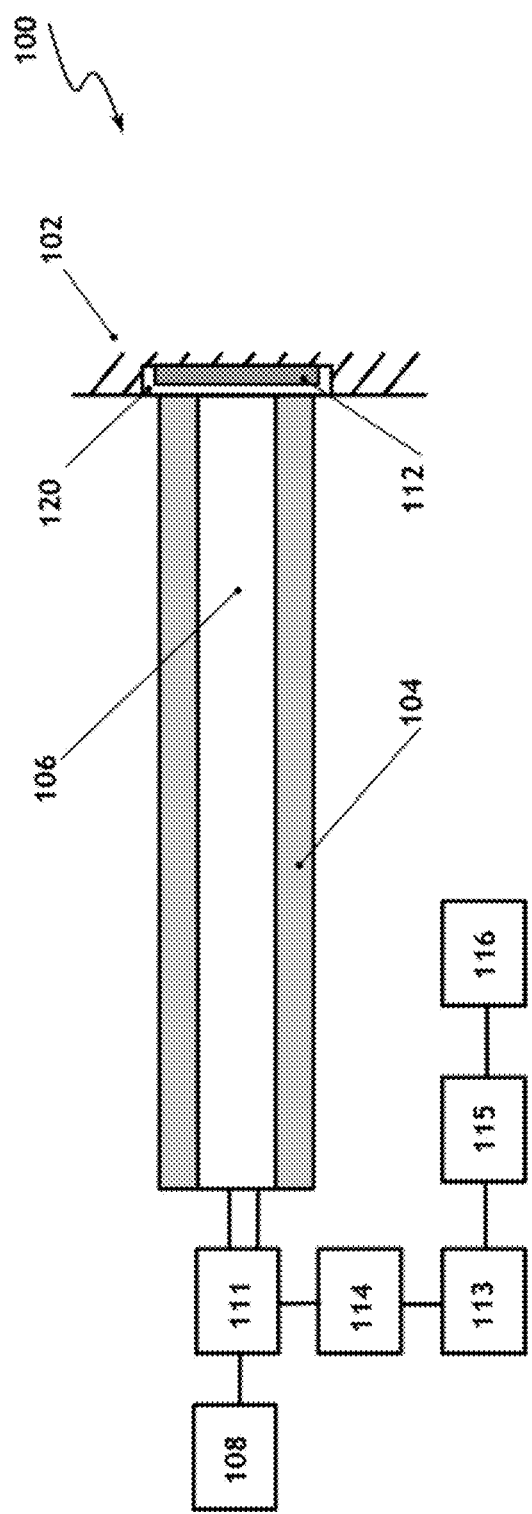
FIG. 3 is a schematic view of an example of an optical device for measuring a parameter of an object with a monolithic ceramic metal oxide phosphor composite embedded within the measured object.

In another mode of operation, illustrated in FIG. 3, the monolithic ceramic metal oxide phosphor composite 112 can be embedded in the measured object 102. For example, a notch 120 can be formed in the object 102 and the monolithic ceramic metal oxide phosphor composite 112 can be inserted and secured therein. The monolithic ceramic metal oxide phosphor composite 112 is held in the notch 120 mechanically without any adhesive or binder. In one implementation, the monolithic ceramic metal oxide phosphor composite 112 can be held in the notch 120 or to the surface of object 102 using an adhesive or a binder. The probe 104 is brought into contact with the measuring object 102 in close proximity to the monolithic ceramic metal oxide phosphor composite 112. When the monolithic ceramic metal oxide phosphor composite 112 is excited with the excitation light it emits light in a wavelength different form the wavelength of the excitation light. Then the emitted light is detected and process in a same fashion as previously described herein above, and a measuring parameter is provided. In one embodiment, the measuring parameter can be the temperature of the object 102. In another embodiment the measuring parameter can be the pressure of the object. The processing unit determines the measuring parameter by calculating the change in emission intensity at a single wavelength or the change in intensity ratio of two or more wavelengths, a shift in emission wavelength or a decay time of the phosphor luminescence.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. Monolithic ceramic metal oxide phosphor composite for measuring a parameter of an object comprising:
 a. a thermographic phosphor; and
 b. a metal oxide material,
 c. wherein the thermographic phosphor is mixed with the metal oxide material to form a metal oxide phosphor composite material which is subsequently dried and calcined to form a ceramic metal oxide phosphor composite, the composite is used for measuring a parameter of an object being measured.

2. The monolithic ceramic metal oxide phosphor composite of claim 1, wherein the metal oxide 1 phosphor composite material is dried and calcined at temperatures of about 400-1500° C.

3. The monolithic ceramic metal oxide phosphor composite of claim 1, wherein the thermographic phosphor is infused in a metal oxide sol-gel material forming a metal oxide sol-gel phosphor composite material.

4. The monolithic ceramic metal oxide phosphor composite of claim 3, wherein the metal oxide material comprises a catalyst to obtain a metal oxide sol-gel material.

5. The monolithic ceramic metal oxide phosphor composite of claim 3, wherein the metal oxide sol-gel phosphor composite material is casted into a mold or is die-casted into a predetermined shape and size before is dried and calcinated.

6. The monolithic ceramic metal oxide phosphor composite of claim 2, wherein the metal oxide phosphor composite material is pressed into a predetermined shape and size before is dried and calcinated.

7. The monolithic ceramic metal oxide phosphor composite of claim 6, wherein the metal oxide sol-gel phosphor composite material is pressed by hot or cold pressing.

8. The monolithic ceramic phosphor composite of claim 1, wherein the thermographic phosphor is selected from a group of Manganese doped $Mg_4FGeO_6$:Mn and all possible stoichiometry within this class, Europium doped $La_2O_2S$:Eu, Europium doped $Y_2O_3$:Eu, Europium doped $LuPO_4$:Eu, Dysprosium doped $YVO_4$:Dy, Dysprosium doped $Y_2O_3$:Dy, Dysprosium doped $LuPO_4$:Dy, Dysprosium doped Yttrium aluminium garnet YAG:Dy and any combination thereof.

9. The monolithic ceramic phosphor composite of claim 1, wherein the metal oxide is selected from a group of Silica ($SiO_2$), Zirconia ($ZrO_2$), Alumina ($Al_2O_3$), Titania ($TiO_2$) and combination thereof.

10. The monolithic ceramic phosphor composite of claim 1, wherein a weight of phosphor in said composite varies from 2 wt % to 90 wt % relative to a weight of the metal oxide material.

11. The monolithic ceramic phosphor composite of claim 1, wherein the measuring parameter is a temperature of the object being measured.

12. The monolithic ceramic phosphor composite of claim 1, wherein the measuring parameter is a pressure of the object being measured.

13. An optical device for measuring a parameter of an object comprising:
   a. a fiber optic probe comprising a light guide;
   b. a light source operatively coupled to the light guide to transmit excitation light to a tip of the probe and an emitted light;
   c. a monolithic ceramic metal oxide phosphor composite of claim 1 functionally coupled to the tip of the probe, wherein when the monolithic ceramic phosphor composite is illuminated with the excitation light it emits light in a wavelength different from the excitation light;
   d. a sensor operatively coupled to the fiber optic probe to detect the light emitted from the monolithic ceramic metal oxide phosphor composite; and
   e. a processing unit functionally coupled to the sensor to process the light emitted from the monolithic ceramic metal oxide phosphor composite, wherein a change in the emission intensity at a single wavelength or the change in intensity ratio of two or more wavelengths, a lifetime decay, or a shift in emission wavelength of the emitted light is a function of the measuring parameter.

14. The optical device of claim 13, wherein the monolithic ceramic metal oxide phosphor composite is positioned at a tip of the fiber optic probe, the fiber optic probe being brought into contact with the object during measurements.

15. The optical device of claim 13, wherein the light source provides excitation light in a wavelength range of 200-600 nm.

16. The optical device of claim 13, wherein the sensor is a photodiode.

17. The optical device of claim 13, further comprising an optical splitter operatively coupled to the sensor to separate the excitation light from the emitted light.

18. The optical device of claim 13, further comprising an amplifier to intensify the detected signal.

19. The optical device of claim 13, further comprising an A/D converter to convert an analog electrical signal obtained by the sensor into a digital signal.

20. The optical device of claim 13, wherein the measuring parameter is a temperature of the object.

21. The optical device of claim 13, wherein the measuring parameter is a pressure of the object.

\* \* \* \* \*